Oct. 7, 1969  AKIRA IWATA ET AL  3,470,584
EXTRUDER FOR SHAPING POWDERY THERMOPLASTIC RESINS
Filed Nov. 14, 1966  5 Sheets-Sheet 1

Akira Iwata and
Sadao Murai,
INVENTORS

BY Wenderoth, Lind
and Ponack, ATTORNEYS

_United States Patent Office_

3,470,584
Patented Oct. 7, 1969

3,470,584
EXTRUDER FOR SHAPING POWDERY THERMOPLASTIC RESINS
Akira Iwata and Sadao Murai, Osaka-fu, Japan, assignors to Sekisui Kazaku Kogyo Kabushiki Kaisha, Osaka, Japan
Filed Nov. 14, 1966, Ser. No. 594,234
Claims priority, application Japan, Nov. 30, 1965, 40/73,880
Int. Cl. B29f 3/02, 3/06
U.S. Cl. 18—12    3 Claims

ABSTRACT OF THE DISCLOSURE

This invention relates to an extruder for shaping powdery thermoplastic resins into shaped articles of good quality and free of voids. The extruder apparatus includes a reduced pressure chamber provided between the outlet of a feed apparatus embodying a barrel having a rotary screw shaft adapted to convey the resin therein, and the feed inlet of a plasticizing apparatus embodying heating means-equipped barrel having a rotary screw shaft to mix, knead and plasticize the resin contained in the barrel. It further has a valve which presses against the outlet of the feed apparatus from the reduced pressure chamber side. Shaped articles having good qualities and free of voids can be prepared by using this extruder.

---

Figure 1:
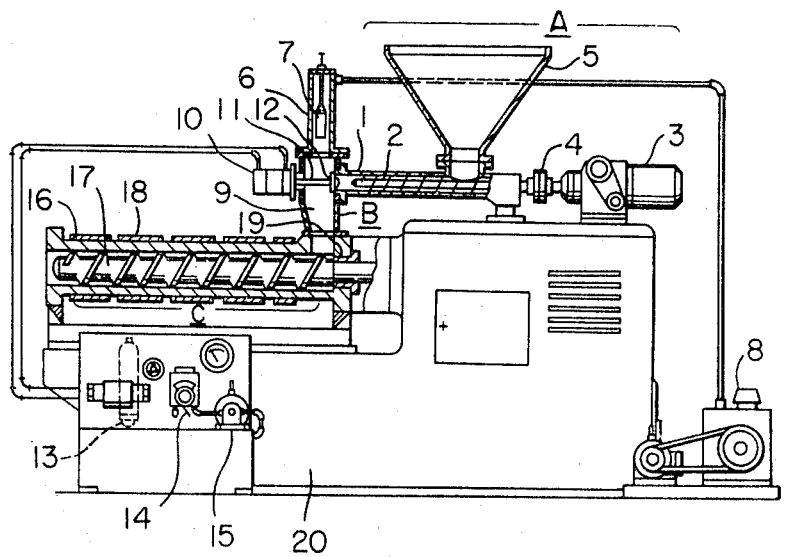

This invention relates to an extruder for extrusion shaping providing thermoplastic resins into tubes, films and sheets and the like, and, in particular, to a new extruder which eliminates air, moisture and other volatile matter from the resin and hence can extrude and form products of good quality which are devoid of bubbles.

In general, when resins are extruded employing a general purpose extruder, the air, moisture and other volatile matter, which are carried along with the resin, remain in the product without being discharged, and hence are likely to be the cause of the formation of bubbles in the product.

This trouble tends to occur when the extruder is of large size and the speed of rotation of the screw shaft is high, or when the resin is not of pellet form but a powder, or when the melt viscosity of the resin is relatively high, such as in the case of the vinyl chloride resins, vinylidene chloride resins, styrene resins and acrylic resins.

Lately, the advantages of using the resin in powdered form in carrying out the extruding operation are attracting attention for the reasons that it is economically favorable, the operation of mixing the materials is greatly facilitated, the thermal history of the resin can be held down to its minimum and the extrusion capacity can be increased. Accordingly, researches have been made and numerous techniques have been developed concerning the method of carrying out the extruding operation while deairing and precluding the entrainment of air and other gases from the resin. Of these techniques, the so-called vented extruder which consists of providing at a suitable position in the barrel or the screw shaft a deairing apparatus for eliminating by suction the air, moisture and other volatile matter contained in the materials is being widely used.

In the vented extruder it is however difficult to design the pitch and configuration of the spiral of the screw shaft and the depth of the groove properly. Even if there is only a slight deficiency in the design, the balance of the pressure of the resin in a molten state gives way at that part before or after the vented portion and the molten resin overflows from the vent to impair the deaeration effect. This phenomenon is also induced by the kind of the resin used, the configuration of the die and extrusion conditions. Thus, it would become necessary to design the extruder in accordance with the kind of resin. Consequently, it was difficult to employ the vented extruder for multipurpose use. Moreover, in providing a deairing apparatus in the barrel or shaft, it is necessary to make the effective length of the screw shaft $L/D$ (where L is the length of the screw shaft which comes in contact with the resin and D is the outer diameter of the screw shaft) longer than the usual extruder, the $L/D$ in the case of a single shaft screw being usually 24/1 or more in a vented extruder.

Thus, if the $L/D$ is made large, the torque that the screw shaft is subjected to inevitable becomes large, and hence it becomes necessary to increase the mechanical strength of the screw shaft. Further, as previously noted, a greater precision is required in designing the screw shaft for achieving the deaeration effectively, with the consequence that there was the drawback that the cost of manufacturing the vented extruder becomes extremely high.

Further, since in the vented extruder the deaeration occurs in a state in which the resin, upon being heated, is in a semimelted or melted state, there is a period in which, prior to the deaeration, the resin in the semimelted or melted state and the air and moisture to be eliminated are in a state of coexistence. During this period, the air and moisture contained in the material have an adverse effect on the resin in its molten state which has been chemically activated by the elevated temperature, as in the case with the general purpose extruder. Hence, it is difficult to plan for an improvement in the quality of the product.

With an end to reduce the bubbles of the extruded product, besides this vented extruder, there has been proposed a vacuum hopper extruder. In this case, the hopper is kept sealed, and the air, moisture, etc., contained in the material resin packed in the hopper are removed by a vacuum pump. In the vacuum hopper extruder the charging of the material becomes intermittent however. Thus, its charging efficiency suffers. Furthermore, since the degree of vacuum in the hopper invariably fluctuates during the charging operation, the amount extruded of the resin is not constant. Hence, when it is to be used commercially, the provision of a complicated and costly apparatus for maintaining the pressure inside the hopper constant becomes a necessity. Consequently, the present utilization of the vacuum hopper extruder commercially is considerably behind that of the vented extruder.

A primary object of this invention is to provide an extruder in which the various drawbacks, as hereinbefore noted, of the conventional deairing apparatus-equipped extruders have been solved by the provision of a reduced pressure chamber between the material feeding apparatus and the plasticizing apparatus.

Another object is to provide an extruder which extrudes products devoid of bubbles by using particularly thermoplastic resins such as vinyl chloride resins in a powdered state having an average particle diameter of the order of less than 1 mm.

A further object is to provide an extruder which can extrude continuously over a prolonged period and stably high quality products having superior appearance, mechanical strength and electrical property, etc.

An additional object of this invention is to provide an extruder which can extrude products devoid of bubbles, the extruder being one which can be fabricated from the general purpose extruder by rebuilding it without expending much labor or expense.

The foregoing objects and advantages can be achieved according to this invention by designing the extruder such that the outlet of the feed apparatus, which conveys the resin by means of a screw shaft disposed longitudinally of a barrel, and the inlet of the plasticizing apparatus, which mixes, kneads and plasticizes the resin by means of a screw shaft disposed longitudinally of a heated barrel, are coupled by way of a reduced pressure chamber and by providing the outlet of the feed apparatus with a valve pressing against it and of such a size that it can close said outlet.

Figure 2:
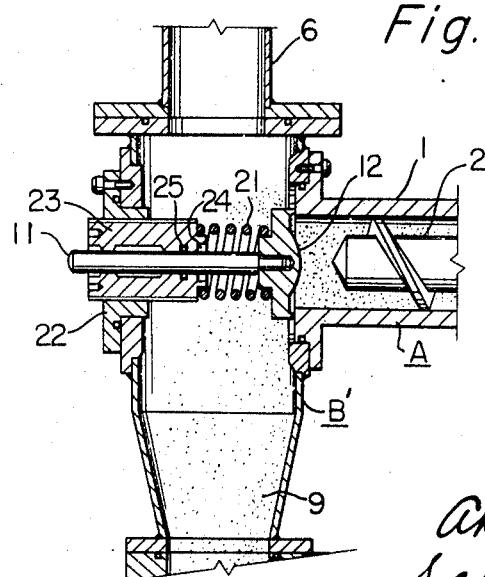
Figure 3:
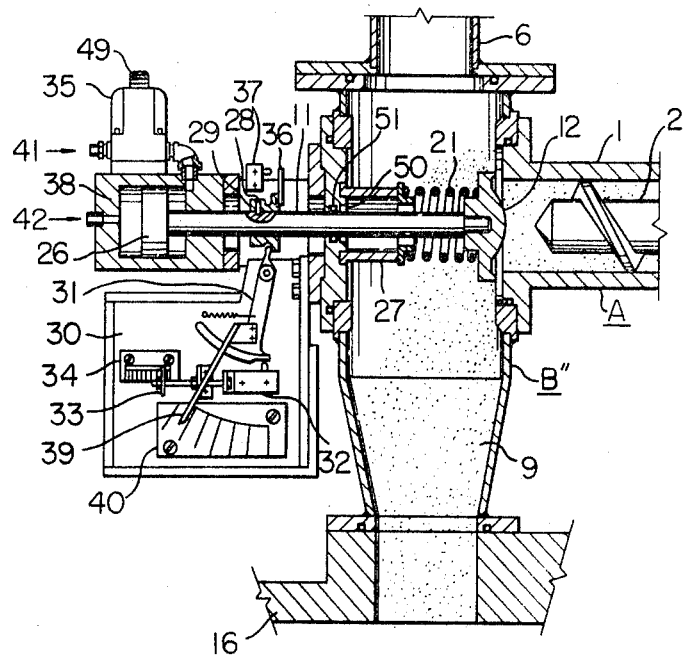
Figure 4:
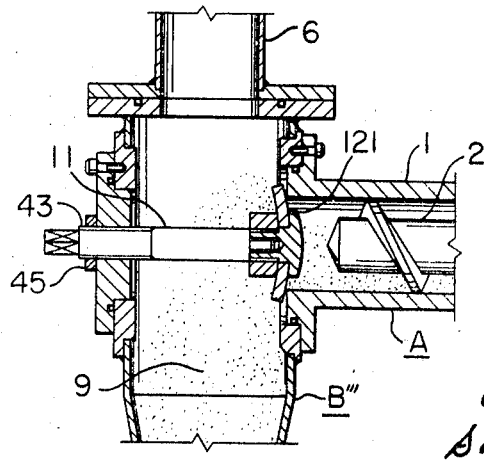
Figure 5:
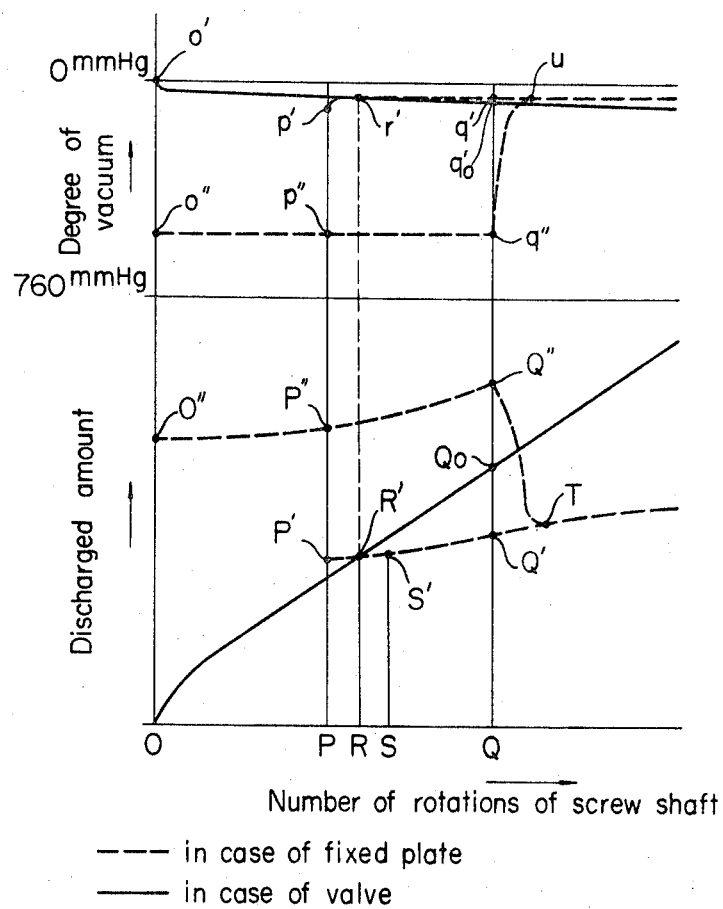
Figure 6:
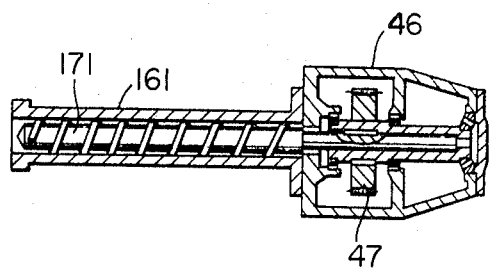
Figure 7:
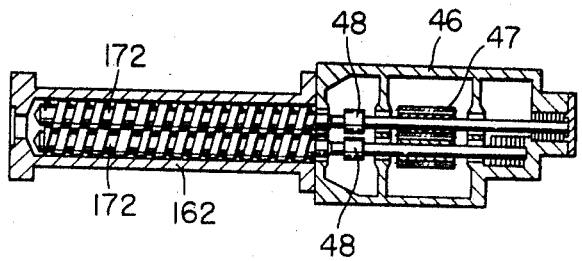
Figure 8:
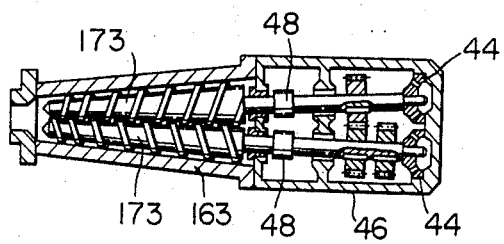
Figure 9:
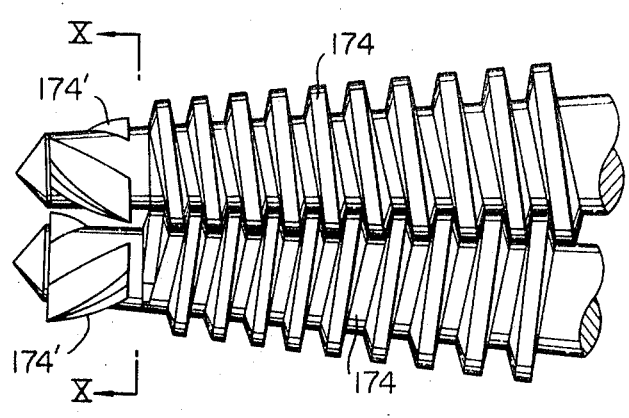
Figure 10:
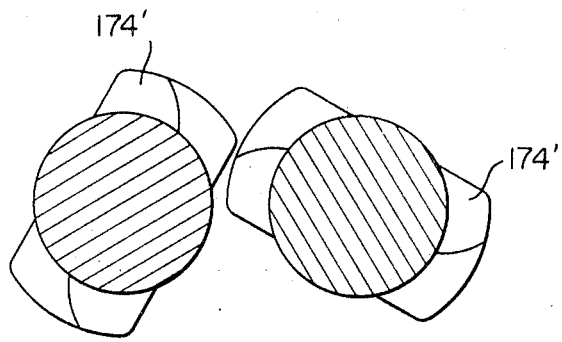

The details of this invention as well as its other objects and advantages will be apparent from the following description and accompanying drawings, wherein:

FIG. 1 is a front elevation partly broken away illustrating an embodiment of the invention extruder; FIGS. 2 to 4 are enlarged sectional views showing different embodiments of the reduced pressure chamber of the invention extruder; FIG. 5 is a graph showing the functions of the valve used in the invention extruder; FIGS. 6 to 8 are sectional views illustrating the different examples of the plasticizing apparatus that are used in the invention extruder; and FIG. 9 is a plan view showing one example of a screw shaft that is used in the plasticizing apparatus of the invention extruder, FIG. 10 is a sectional view taken along line X—X of FIG. 9 and as viewed in the arrow direction.

Next, the extruder according to this invention will be described, reference being had to the accompanying drawings.

Referring to FIG. 1, A is the feed apparatus which consists of a barrel 1 in which is disposed longitudinally thereof a screw shaft 2 which is rotated through the intermediary of a coupling 4 by a drive means 3, the apparatus being so adapted to convey successively forward the resin which has been fed into the barrel 1 from a hopper 5.

As the resins to be used in the invention extruder include the acrylonitrile-styrene copolymers, acrylonitrile-butadiene-styrene copolymers, acetal resins, vinylidene chloride resins, vinyl chloride resins, chlorinated polyvinyl chloride resins, styrene resins, chlorinated polyether resins, styrene-butadiene copolymers, cellulosic derivatives, vinyl butyral resins, fluoride resins, polyamide resins, polyethylene resins, polycarbonate resins, polypropylene resins, polymethyl methacrylate resins and methyl methacrylate-styrene copolymers. These resins may be used singly or as a mixture of two or more thereof.

Further, also usable is a mixture consisting of the foregoing resins to which have been added such additives as stabilizers, lubricants, fillers, crosslinking agents, foaming agents, antioxidants and other additives, or a non-tacky mixture consisting of the aforesaid resigns to which have been added a liquid plasticizer or stabilizer, thus preventing the blocking between the individual resins by such as hot blending.

Thus, in the extruder of this invention, as will be detailed hereinbelow, in order that the resins are compressed in the outlet of the feed apparatus (A) and form a so-called material seal to intercept the circulation of and to preclude the entrainment of the air, it is necessary for the resins to be in a form of powder and it is particularly preferred to use resins having an average diameter of less than 1 mm.

B is the reduced pressure chamber, which is interposed between the outlet of the feed apparatus A and the hereinafter described plasticizing apparatus C. The inside 9 of the reduced pressure chamber can be maintained in a state of a vacuum or reduced pressure by means of a vacuum pump 8 by way of an exhaust pipe 6, 7 is a bag filter disposed in the exhaust pipe 6 and is for filtering the resin, etc., from the fluid inside the exhaust pipe 6. In the wall of the reduced pressure chamber B opposing the outlet of the feed apparatus A there is installed an air cylinder 10 from which extends therefrom and passing through the wall and into the inside 9 of the reduced pressure chamber B a rod 11 of said cylinder. At the distal end of the rod 11 a valve 12 of such a size as sufficient to close the outlet of the feed apparatus A is provided. The fluid inlet pressure side of the air cylinder 10 is connected by means of a tube to a fluid pump 15 via a pressure accumulator 13 and a relief valve 14. Valve 12 is pressed against the outlet of the feed apparatus A by means of a given pressure of the fluid which flows into the air cylinder 10 from its fluid inlet at the pressure side. The magnitude of the force by which the valve 12 presses against the outlet of the feed apparatus A is somewhat less than the force with which the resin is pressed out from the outlet of the feed apparatus A by the rotation of the screw shaft 2 of the feed apparatus. Hence, the pressing force of the valve 12 is so adjusted that the resin being pressed out from the outlet of the feed apparatus A causes the valve 12 to recede by the force of the pressed-out resin, thus creating between the valve 12 and the outlet of the feed apparatus A a clearance from which a suitable amount of the resin is discharged. It is, of course, also possible to employ a hydraulic cylinder instead of the air cylinder.

C is the plasticizing apparatus, and it consists of a barrel 16, a screw shaft 17 and a heating means 18. Barrel 16 is heated by the heating means 18 from its outside. Screw shaft 17, which is disposed inside the barrel 16 longitudinally thereof, is rotated by a drive means provided in a machine frame 20. Thus, the resin inside the reduced pressure chamber B is fed therefrom into the barrel 16 from the inlet of the plasticizing apparatus C, where it is plasticized by the rotation of the screw shaft 17 and the application of heat by the heating means 18, after which it is pressed out from the outlet of the plasticizing apparatus C. Further, at the proximal part of the screw shaft 17 a stuffing box 19 is provided about the shaft to prevent the entry of outside air.

FIG. 2 illustrates a modification B′ of the reduced chamber B, shown in FIG. 1, of the invention extruder. In this embodiment, for pressing the valve 12 against the outlet of the feed apparatus A, a coil spring 21 is used instead of the air cylinder 10 shown in FIG. 1. In the wall of the reduced pressure chamber B′ opposing the outlet of the feed apparatus, a collar 22 is provided. Collar 22, which has a threaded hole, is fitted with a sleeve 23 having screw threads provided in its peripheral surface, the latter being screwed into the hole of the sleeve 23. A rod 11 passes through the inside of the sleeve 23, and a valve 12 is fitted to the distal end of said rod 11. A coil spring 21 is provided between the valve 12 and the sleeve 23. Valve 12 is pressed against the outlet of the feed apparatus A by the compression spring 21, the pressing force being adjustable by means of the amount the sleeve 23 is screwed into the collar 22.

For preventing the entry of resin into the inside of the sleeve 23 wherein the rod 11 makes sliding movements axially thereof, an annular seal 24 is provided, and for further shutting off the inside 9 of the reduced pressure chamber B′ from the outside, an O ring 25 is provided. Again, the periphery of the sleeve 23 is shut off from the outside by means of a sealing material such as Teflon tape. Since the outlet of the feed apparatus A is closed by means of the valve 12, the resin which is conveyed through the barrel 1 of the feed apparatus by the screw shaft 2 becomes compressed at the outlet portion of the feed apparatus, and thus forms a so-called material seal to shut off the passage of air. The resin is however successively conveyed by the screw shaft 2, and hence the resin which has been compressed once counters the pressing force of the coil spring 21 to open the valve 12 slightly to be fed into the inside 9 of the reduced pressure chamber from the clearance formed. The air, moisture and other volatile matter contained in the resin are here discharged via the exhaust pipe 6 by means of the vacuum pump 8.

However, in those cases where the resin used contains a small amount of a lumpy matter or those cases where blocking takes place in the resin during the time it is being conveyed through the feed apparatus A, the lumpy matter contained in the resin from the first or the lump formed as a result of blocking gets clogged in the narrow clearance portion between the outlet of the feed apparatus A and the valve once, in consequence of which the valve 12 is pushed open to an abnormally great extent by the resin which follows to destroy the material seal. As a result, the amount of material fed to the plasticizing apparatus fluctuates and the pressure in the inside 9 of the reduced pressure chamber rises to impede the deaeration effect. This greatly affects the properties of the extruded product at times.

FIG. 3 illustrates another modification B'' of the deairing apparatus used in the extruder of this invention. This embodiment has been so designed that when a lumpy matter gets caught in between the valve 12 and the outlet of the feed apparatus A and the clearance therebetween becomes abnormally great, this is detected by a first limit switch 32 and an air cylinder 38 is operated whereby the valve 12 is momentarily caused to be receded in a direction opposite to that in which it is normally pressed against the outlet of the feed apparatus A, with the consequence that the lumpy matter is dropped into the inside 9 of the reduced pressure chamber, following which the valve 12 reverts to its original position. In FIG. 3, the air cylinder 38 fitted with a piston 26 in its inside and an indicator plate 30 are shown installed at the side wall of the reduced pressure chamber B''.

Rod 11 of the piston, as in the case with that shown in FIG. 1, passes through the side wall of the reduced pressure chamber B'' and has a valve 12 screwed on at its distal end.

Opposite from the outlet of the feed apparatus and in the side wall of the reduced pressure chamber B'' is installed a collar 27 through which passes the rod 11, a coil spring 21 being interposed between the valve 12 and the collar 27. Valve 12 is normally pressed against the outlet of the feed apparatus A by the compression spring 21. Now, when a lumpy matter becomes caught between the narrow clearance between the valve 12 and the outlet of the feed apparatus A, the valve 12 inevitably recedes towards the direction opposite to its advance towards the outlet of the feed apparatus A in proportion to the magnitude of the lumpy matter. Hence, a ring 29 secured to the rod 11 by means of a pin 28 rotates a lever type cam 31 pivoted to the indicator plate 30 and a first limit switch 32 is pressed. The position of the first limit switch 32 is set with an adjusting nut 33 so that it operates when the clearance between the valve 12 and the outlet of the feed apparatus A attains a given value, this position being indicated on a scale 34. Valve 12, in its normal state, is pressed towards the outlet of the feed apparatus A by only the spring 21 and not by the fluid pressure inside the air cylinder 38. However, when the limit switch 32 is operated by the cam 31, a 3-way solenoid valve 35 fitted to the air cylinder 38 is actuated and compressed air is introduced from an intake port 41 to move the piston 26, in consequence of which the valve 12 is moved in a direction opposite to that in which it presses whereby a spring plate 36 attached to the ring 29 is retracted to a position where it presses a second limit switch 37 and hence the clearance between the valve 12 and the outlet of the feed apparatus A is widened and the lumpy matter caught therebetween is caused to be dropped therefrom.

Since the electric current to the 3-way solenoid valve 35 is immediately cut off upon pressing of the second limit switch 37 by means of the spring plate 36, the flow of the compressed air from the intake port 41 is cut off and at the same time the high pressure air inside the air cylinder 38 is exhausted from an exhaust pipe 49 to the outside. As the pressure inside the cylinder 38 diminishes, the valve 12 again presses against the outlet of the feed apparatus A as a result of the restoring force of the spring 21. The clearance between the valve 12 and the outlet of the feed apparatus A can be determined from the outside by means of the dial 40. Further, 42 is a vent provided in the cylinder 38, and 50 and 51 are respectively a seal member and an O ring provided in that part where the piston rod makes its sliding movements. Further, it is also possible to employ a hydraulic cylinder instead of the air cylinder.

It is preferred that this forced opening and closing action of the valve 12 is carried out in a very short period of time in consideration of the fluctuations in the amount fed of the resin and the degree of vacuum of the inside 9 of the reduced pressure chamber. Since an apparatus such as shown in FIG. 3 makes it possible to carry out this action very instantaneously, the fluctuations in the amount fed of the resin and the degree of vacuum inside the reduced pressure chamber offer no problem at all.

Thus, if the extruder of this invention is equipped with this apparatus which instantaneously removes the lumpy matter that gets caught between the valve 12 and the outlet of the feed apparatus A, the invention extruder can be operated stably and continuously with no trouble whatsoever.

On the other hand, FIG. 4 illustrates a reduced pressure chamber B''' in which is employed a valve 121 consisting of either a rubber or plastic plate or a thin metallic plate having great flexibility.

In FIGS. 1 to 3, the valve 12 was one, which could be moved by means of a spring or fluid pressure of an air cylinder, along with the rod 11 which supported it, in a direction towards the outlet of the feed apparatus A or opposite therefrom. On the other hand, the valve 121 shown in FIG. 4 is fitted to a rod 11 which is screwed into the side wall of the reduced pressure chamber B''' by being tightened with a lock nut 45 is attached so as to be immovable.

Valve 121 is pressed against the outlet of the feed apparatus A by means of the elastic restoring force of the valve itself. During the time the feed apparatus is inoperative, the valve 121 and the outlet of the feed apparatus A are in close adherence, but during operation of the feed apparatus the resin being conveyed along in the feed apparatus A counters the elastic restoring force of the valve 121 to deform the valve and create a clearance between the valve 121 and the outlet of the feed apparatus A, through which clearance the resin drops into the inside 9 of the reduced pressure chamber.

FIG. 5 is a graph illustrating the differences between the instance according to this invention wherein, as shown in FIG. 3, the valve 12 disposed inside 9 of the reduced pressure chamber is pressed against the outlet of the feed apparatus A by means of the spring 21, and the instance wherein a plate is disposed at the outlet of the feed apparatus A in such a manner that a given clearance is made to exist between it and the outlet, i.e., an instance where a fixed plate has been used, an instance not according to this invention. The number of rotations of the screw shaft 2 is plotted along the horizontal axis, while the amount of resin discharged from the feed apparatus A into the inside 9 of the reduced pressure chamber and the degree of vacuum inside the latter are shown along the vertical axis. The solid line represents that according to this invention, whereas the broken line represents that not according to this invention, i.e., when the fixed plate was used.

In FIG. 5, when the number of rotations of the screw shaft 2 is changed O→P→Q, the amount of the resin discharged increases with being reduced the pressure of the inside 9 of the reduced pressure chamber by means of a vacuum pump 8, but the amount discharged thereafter becomes O''→P''→Q'', manifesting hardly any change at all, since the resin is not compressed.

Next, if before reducing the pressure of the inside 9 of the reduced pressure chamber the screw shaft 2 is rotated at a number of rotations exceeding P and a dense mass of the resin is formed in advance at the distal end of the screw shaft 2, the resin being successively conveyed being subjected to the resistance of dense mass formed at the distal end becomes compressed, with the consequence that the amount discharged of the resin declines and becomes P′–Q′, and the amount of resin discharged shows practically no increase even though the number of rotations of the screw shaft is increased.

Further, if the number of rotations of the screw shaft 2 is further increased from the state of O″–P″–Q″, the resin at the distal end of the screw shaft 2 becomes compressed excessively and, as a result, the amount discharged of the resin decreases abruptly to coincide at point T with the extension of P′–O′.

On the other hand, when the degree of vacuum of the inside 9 of the reduced pressure chamber is investigated in the case where the fixed plate was used, it is as follows. If the number of rotations of the screw shaft is changed O→P→Q, whereas the amount discharged of the resin changes O″–P″–Q″, the degree of vacuum becomes O″–$p$″–$q$″, which is nearly constant, and it is very difficult to reduce the pressure of the inside 9 of the reduced pressure chamber.

However, in the case where a dense mass of resin is formed in advance at the distal end of the screw shaft 2, it becomes possible to reduce the inside 9 of the reduced pressure chamber to a very low pressure, and even though the number of rotations of the screw shaft 2 is increased, the degree of vacuum can be held nearly constant at $p$′–$q$′. If the number of rotations of the screw shaft 2 is further increased to above Q from the O″–$p$″–$q$″ state, the degree of vacuum also coincides at the point $u$.

Thus, as hereinabove described, the clearance between the fixed plate and the outlet of the feed apparatus A is not material-sealed, and hence the degree of vacuum cannot become O″–$p$″–$q$″ to reduce the pressure of the inside 9 of the reduced pressure chamber. In consequence, defoaming of the resin cannot be fully accomplished.

On the other hand, when a dense mass of the resin is formed in advance at the distal end of the screw shaft 2, or a similar dense mass is obtained by increasing the number of rotations of the screw shaft (it is a difficult matter to form such a dense mass artificially, it actually being a phenomenon which occurs accidentally during operation), the pressure of the inside 9 of the reduced pressure chamber is reduced and a high degree of vacuum can be obtained, but since an over compressed dense mass is formed at the outlet of the feed apparatus A, it becomes very difficult to increase the amount of resin that is discharged, and hence it is by no means to be desired.

If the point of operation in which the efficiency is comparatively good is sought in the case where the fixed plate is used, it is along the curve P′–S′ circa the intersecting point R′ of the curve O–Q₀ in the case the valve is used and curve P′–Q′ where the dense mass has been formed, but in this case it is difficult to increase the amount discharged of the resin proportionally as the number of rotations of the screw shaft is increased. Furthermore, this dense mass is very unstable, there being instances in which it changes suddenly from P′–Q′ state to P″–Q″ state. On the other hand, if the dense mass formed at the distal end of the screw shaft 2 does not give way but remain intact, the resin being conveyed in concomitance with an increase in the number of rotations of the screw shaft 2 accumulates at the distal end part of the screw shaft and the resin becomes compressed to excessive degree at this part. Hence, not only does it become necessary to increase the pressure-resisting strength of the body of the machine or the capacity of the drive means above the standard requirement of the equipment, but also the evolution of a considerable amount of heat takes place as a result of resin being compressed to an abnormal degree and on occasions the resin melts inside the barrel 1 of the feed apparatus A to render the operation impossible.

Thus, as hereinbefore described, the objects of this invention cannot be attained by the use of the fixed plate, since the amount fed of the resin and the degree of vacuum of the inside 9 of the reduced pressure chamber is very unstable. In contradistinction to the instance where the fixed plate is used, if, as in this invention, a valve is used, the resin pressure at the clearance between the valve 12 and the outlet of the feed apparatus A is always maintained constant by means of the material seal. Hence, the amount discharged of the resin, as indicated by curve O–Q₀ increases practically proportional to the number of rotations of the screw shaft 2. Consequently, the degree of vacuum of the inside 9 of the reduced pressure chamber becomes stable and is practically constant as shown by curve $o$′–$q_0$′. Therefore, the extruder of this invention can be efficiently operated.

It is, of course, desirable that the degree of vacuum of the inside 9 of the reduced pressure chamber approaches zero, but generally a reduced pressure of 300 mm. Hg. will do, the degree of vacuum usually employed in operating the invention extruder being of the order of 100–250 mm. Hg.

Thus, since a valve has been provided at the outlet of the feed apparatus of the extruder of this invention and the resin conveyed thereto is compressed to cover the clearance between the valve and the outlet of the feed apparatus with a material seal, the degree of vacuum inside the reduced pressure chamber interposed between the outlet of the feed apparatus and the inlet of the plasticizing apparatus can be raised, and the air, moisture and other volatile matter contained in the resin can be completely removed at the inside of said reduced pressure chamber. Furthermore, since the air and moisture are removed, the resin is not adversely affected by such as an oxidation action even though it becomes chemically active by being heated and melted in the barrel of the plasticizing apparatus. Hence, when the invention extruder is employed, products of high quality excelling in mechanical strength, electric properties, appearance, resistance to chemicals and weatherability can be continuously extruded even from resins in powdered form.

Further, as the construction of the reduced pressure chamber of the invention extruder is simple, the invention extruder can be readily fabricated by just installing it to any of the conventional extruders. In addition, the expense required for its installation is exceedingly low.

Next, typical type of plasticizing apparatuses which can be used with the invention extruder will be illustrated.

FIG. 6 shows a most common plasticizing apparatus which consists of a single screw shaft 171. However, the use of a plasticizing apparatus provided with two screw shafts 172, 172, such as shown in FIG. 7, is still more effective according to this invention, since the amount of material fed to the plasticizing apparatus C does not fluctuate, it being practically constant. Although not shown, an apparatus using three or more screw shafts is equally effective.

The most preferred plasticizing apparatus is one such as shown in FIG. 8 wherein two conical screws 173, 173, which taper towards the distal end, are used.

This plasticizing apparatus, which uses two conical screws, will be more fully described. Since the outer diameters of the two meshing screw shafts taper towards the distal ends of the screws, the distance between the axes of the screw shafts can be made the maximum at the proximal part of the screw shafts, in consequence of which it is possible to install thrust bearings of such size as to be fully capable of withstanding the heavy load that is imposed when the amount extruded of the material has been increased.

Again, if the screw shafts are made conical in shape, as hereinabove described, the clearance volume between the screw shafts 173 and the barrel 163 can be sufficiently reduced progressively from the proximal to the distal portion of the screw shafts, and hence it is possible to provide for a compression ratio necessary for compressing the resin.

Further, for accomplishing the thorough mixing and kneading of the molten resin, it is still more desirable to provide at the distal end of the screw shafts mixing and kneading vanes 174', 174' which are disposed at a greater angle than the helical angle of the other spiraled portion of the shaft. By having provided mixing and kneading vanes 174', 174' at the distal end of the conical screw shaft 174 in this manner, the fear that the melt blending and kneading of the material resin would be insufficient is completely done away with, and since the screw shaft need not be so long, and along with the fact that the diameter of the distal end of the shaft is small, there is no cause for bending of the screw shaft to occur because of its weight. In addition, the mounting and dismounting of the barrel can be readily carried out.

Thus, as hereinabove described, if the conical screw shaft, which has been provided at its end with the mixing and kneading vanes as shown in FIGS. 9 and 10, is used in the plasticizing apparatus of the invention extruder, not only can the amount extruded of the resin be increased, but also since the formation of bubbles in the product and the air, moisture and other foreign matter, which are related to the thermal degradation of the resin, are completely eliminated in the reduced pressure chamber before the melting of the resin, there is no need for any concern at all.

Further, in FIGS. 6 to 8 the reference numeral 46 denotes the casing and 47, the gears for transmitting the rotation of the motor (not shown) to the screw shafts, and 48, the spline coupling.

EXAMPLE 1

As the invention extruder, one made up as follows was employed. The feed apparatus A was the one shown in FIG. 1 which was equipped with a screw shaft having an outer diameter of 86 mm., the reduced pressure chamber B was that shown in FIG. 3, and the plasticizing apparatus C was one equipped with two conical screw shafts at whose distal ends were provided the mixing and kneading vanes, as shown in FIG. 9.

The degree of vacuum was held at a certain temperature ±20 mm. Hg. within a range of an absolute pressure of 100–250 mm. Hg.

On the other hand, the resin pressure at the distal end of the screw shaft of the feed apparatus, i.e. the value obtained by dividing the spring pressure by the sectional area of the screw shaft, was 1.8 kg./cm.$^2$.

In this instance, the outer diameter of the distal part of the screw shaft of the plasticizing apparatus was 100 mm., the outer diameter of its proximal part was 154 mm. and its length was 90 mm.

The composition of the starting materials used was as shown in Table I, below. Unless otherwise noted, the parts as used in the examples herein are all on a weight basis.

Table I

| Materials used: | Part |
|---|---|
| Vinyl chloride resin (degree of polymerization 1000, straight PVC) | 100 |
| Tribasic lead sulfate | 3 |
| Dibasic lead stearate | 1 |
| Calcium stearate | 1.5 |
| Synthetic wax | 1.5 |
| Pigment | Small amount |

The foregoing mixture was hot blended for 20 minutes at 160° C. in a Henschel fluidizing mixer followed by cooling to obtain a powder mixture having a bulk density of 0.70 g./cc., which all pass through a 20-mesh screen. Employing the hereinabove described extruder, this powder mixture was extruded into large-diameter pipes having an outer diameter of 10 inches. A pipe excelling in both appearance as well as properties was obtained. In this instance, the maximum amount extruded was 200 kg./hr. while the average amount extruded was 175 kg./hr.

EXAMPLE 2

An extruder provided with the same feed apparatus A and reduced pressure chamber B, but using as its plasticizing apparatus one with two screw shafts as shown in FIG. 7 was employed.

In this case, the outer diameter of the screw shafts of the plasticizing apparatus was 110 mm. while the length of the shafts was 1000 mm.

Table II

| Materials used: | Part |
|---|---|
| Vinyl chloride resin (degree of polymerization 1000, straight PVC) | 100 |
| Adekacizer 0–140 (epoxy type plasticizer) | 10 |
| Dibutyl tin dilaurate | 3 |
| Dibasic lead stearate | 0.5 |

When the foregoing mixture was hot blended for 30 minutes at 100° C. using a ribbon blender, a free flowing powder mixture which all passes through a 40-mesh screen was obtained. When this power was extruded by means of the hereinabove-described extruder and formed into a sheet, a semihard sheet of excellent transparency possessing satisfactory appearance as well as properties was obtained.

EXAMPLE 3

The extruder employed in this experiment was one equipped with the same feed apparatus A and reduced pressure chamber B as in Example 1, but the plasticizing apparatus C was one which was equipped with the single shaft screw shown in FIG. 6. The $L/D$ of the screw shaft of this plasticizing apparatus was 20/1.

Table III

| Materials used: | Part |
|---|---|
| Powdered polyethylene | 100 |
| Azodicarbonamide | 5 |
| Di-tert. butylperoxide | 1 |

When the foregoing mixture was cold blended for 20 minutes by means of a kneader, a powder mixture all passing a 60-mesh screen was obtained.

This powder was extruded employing the hereinbefore described invention extruder, while preventing the decomposition of the foaming agent and the crosslinking agent, after which it was again heated, whereupon a uniform foamed product was obtained without any abnormal foaming.

EXAMPLE 4

The mixture of a composition as in Table IV was cold blended for 20 minutes using a kneader.

Table IV

| Materials used: | Part |
|---|---|
| Powdered polyethylene | 100 |
| Dicumylperoxide | 0.5 |

A powder mixture all passing a 60-mesh screen was obtained. This powder was extruded employing the invention extruder described in Example 3, at a temperature (130° C.) at which its fluidity was not hampered by crosslinking. The extruded product was then reheated in an air oven at 200° C., whereupon a crosslinked polyethylene molded product having excellent properties and devoid of bubbles inside was obtained.

We claim:
1. An extruder for shaping powdery thermoplastic resins comprising:
   (a) a feed apparatus including a barrel having a screw shaft longitudinally disposed therein and adapted to convey by means of the rotation of said screw shaft the resin inside said barrel to an outlet thereof;

(b) a plasticizing apparatus including a heating means equipped barrel having at least one screw shaft longitudinally disposed therein and adapted to mix, knead and plasticize by means of the rotation of said screw shaft, said resin contained in said barrel;

(c) a reduced pressure chamber interposed between the outlet of said feed apparatus and the feed inlet of said plasticizing apparatus;

(d) said outlet of the feed apparatus and said feed inlet of the plasticizing apparatus being hermetically connected to said reduced pressure chamber;

(e) a valve of sufficient magnitude capable of closing said outlet of the feed apparatus, said valve including means for pressing it against the outlet from the reduced pressure chamber side, and (f) said means of paragraph (e) for pressing the valve including a coil spring disposed on a surface opposite to that of said valve which faces the outlet of the feed apparatus, whereby said valve is pressed against the outlet of the feed apparatus by the restoring force of said coil spring.

2. An extruder for shaping powdery thermoplastic resins comprising:

(a) a feed apparatus including a barrel having a screw shaft longitudinally disposed therein and adapted to convey by means of the rotation of said screw shaft the resin inside said barrel to an outlet thereof;

(b) a plasticizing apparatus including a heating means-equipped barrel having at least one screw shaft longitudinally disposed therein and adapted to mix, knead and plasticized by means of the rotation of said screw shaft said resin contained in said barrel;

(c) a reduced pressure chamber interposed between the outlet of said feed apparatus and the feed inlet of said plasticizing apparatus;

(d) said outlet of the feed apparatus and said feed inlet of the plasticizing apparatus being hermetically connected to said reduced pressure chamber;

(e) a valve of sufficient magnitude capable of closing said outlet of the feed apparatus, said valve including means for pressing it against the outlet from the reduced pressure chamber side; and (f) wherein said valve is made of a material possessing elasticity and flexibility and the valve is pressed against the outlet of the feed apparatus by means of the elastic restoring force of the valve itself.

3. An extruder for shaping powdery thermoplastic resins comprising:

(a) a feed apparatus including a barrel having a screw shaft longitudinally disposed therein and adapted to convey by means of the rotation of said screw shaft the resin inside said barrel to an outlet thereof, (b) a plasticizing apparatus including a heating means-equipped barrel having at least one screw shaft longitudinally disposed therein and adapted to mix, knead and plasticize by means of the rotation of said screw shaft said resin contained in said barrel, (c) a reduced pressure chamber interposed between the outlet of said feed apparatus and the feed inlet of said plasticizing apparatus, (d) said outlet of the feed apparatus and said feed inlet of the plasticizing apparatus being hermetically connected to said reduced pressure chamber, (e) a valve of sufficient magnitude capable of closing said outlet of the feed apparatus, said valve including means for pressing it against the outlet from the reduced pressure chamber side, (f) said means for pressing the valve as per paragraph (e) including valve actuating means including a fluid pressure cylinder having fluid inlets, said cylinder being disposed externally of said reduced pressure chamber, a piston shiftable within said cylinder and having a piston rod projecting therefrom which passes through the wall of the reduced pressure chamber into the inside of said chamber, the distal end of said piston rod being fitted with a valve, a coil spring being disposed on the valve at the surface thereof opposite to the surface facing the outlet of the feed apparatus, whereby the valve is pressed against the outlet of the feed apparatus by means of the restoring force of said spring, (g) said valve actuating means further including a first limit switch which is operated when said valve moves in the direction away from the outlet of the feed apparatus, a second limit switch which is operated when said valve moves still further in said opposite direction, and a 3-way solenoid valve which in one position is connected with a first fluid inlet of said fluid pressure cylinder, when in the second position is connected with a second of the fluid inlets and when in the third position opens to the outside atmosphere, and (h) whereby said solenoid valve is opened by the operation of said first limit switch to feed a high pressure fluid into the fluid pressure cylinder, is closed by the operation of said second limit switch to stop the feed of the high pressure fluid into the fluid pressure cylinder and simultaneously effects the communication of the inside of the fluid pressure cylinder with the outside atmosphere.

References Cited

UNITED STATES PATENTS

| | | | |
|---|---|---|---|
| 1,614,526 | 1/1927 | Lambie et al. | 264—102 |
| 1,987,358 | 1/1935 | Bonnot | 264—102 |
| 1,987,359 | 1/1935 | Broown | 25—11 |
| 2,183,693 | 12/1939 | Rash | 25—14XR |
| 2,453,088 | 11/1948 | Dulmage. | |
| 2,466,934 | 4/1949 | Dellenbarger. | |
| 2,680,879 | 6/1954 | Schnuck et al. | |
| 2,693,348 | 11/1954 | Ellevmann. | |
| 2,785,455 | 3/1957 | McElroy | 25—14 |
| 3,246,594 | 4/1966 | Fisher. | |
| 3,325,864 | 6/1967 | Kohyama et al. | |

FOREIGN PATENTS

| | | |
|---|---|---|
| 547,068 | 5/1956 | Belgium. |
| 341,307 | 11/1959 | Switzerland. |

WILLIAM J. STEPHENSON, Primary Examiner.

U.S. Cl. X.R.

25—11.